Nov. 1, 1932.  C. R. RICH  1,885,629

GAUGE

Filed May 18, 1931

Witness:

INVENTOR.
Claude R. Rich
BY
ATTORNEYS.

Patented Nov. 1, 1932

1,885,629

UNITED STATES PATENT OFFICE

CLAUDE R. RICH, OF GRAND RAPIDS, MICHIGAN, ASSIGNOR TO TEESDALE MANUFACTURING CO., OF GRAND RAPIDS, MICHIGAN, A CORPORATION OF MICHIGAN

GAUGE

Application filed May 18, 1931. Serial No. 538,226.

The present invention relates to gauges and more particularly to gauges for determining the quantity of liquid within a supply tank.

The main objects of the invention are to provide a gauge of the character above indicated which is particularly adaptable for use with oil-burner installations; to provide such a gauge which is adaptable for use in pressure or vacuum feed oil-burner installations; and, to provide means for adjusting the gauge whereby it may be made adaptable for supply tanks having varying lifts.

An illustrative embodiment of the invention is shown in the accompanying drawing wherein.

Figure 2:
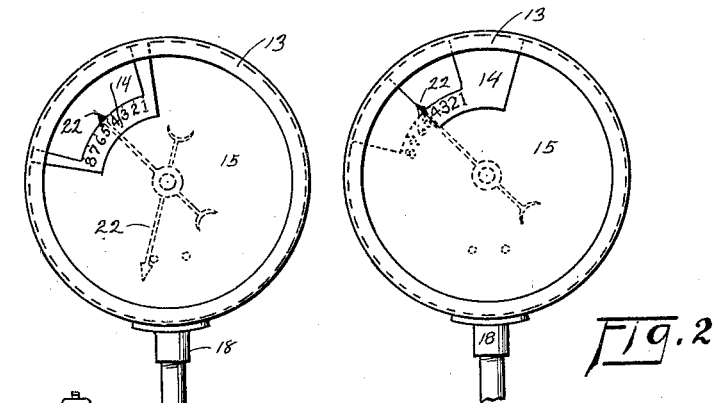
Figure 2 is a front elevational view of the gauge per se after it has been adjusted for a particular installation.

The gauge herein shown and described is designed for use in conjunction with oil-burner installations for indicating the amount of oil in the supply tank. The instrument is installed in the suction line between the oil supply tank or reservoir and the booster pump in vacuum feed systems and in the oil feed line between the supply tank and the burner in gravity feed burners. The installation herein shown and described discloses the gauge in a vacuum feed oil-burner installation.

In oil-burner installations generally, the oil supply tanks seldom have a cross-sectional width of more than eight feet and generally average a four or five. As will be understood by those skilled in the art to which this invention relates, the lift in vacuum feed systems is determined by the vertical foot distance between the oil level in the supply tank and the level of the booster pump. In gravity feed systems, the lift is determined by the vertical foot distance between the oil level in the supply tank and the oil delivering nozzle of the burner. The size or shape of the tank, of course, has no effect upon the lift in either vacuum or gravity feed systems.

Referring to the drawing in which like numerals designate the same parts in the several views a fuel oil supply tank 1 of an oil-burner installation, has an outlet conduit 2 leading to an automatically operated booster pump 3 for pumping the fuel oil 4 from the supply tank through the conduit 5 to the burner, not shown.

A cylindrical vacuum gauge 6 within the suction conduit 2 between the tank 1 and pump 3 has a closed back 7 and an open face covered by a disc 8 secured within the cylinder to a supporting arm 9 in any suitable manner as by the screws 10.

A transparent glass disc 11 is retained against the peripheral flange 12 of the open face of the cylinder by a cup 13 having an open face and of slightly greater diameter than the cylinder which it frictionally embraces. A dial 14 bearing numerical indicia as indicated is manually rotatably disposed within the cup 13 and a blank or blind 15 is disposed over the dial which is likewise manually rotatable. A spring member 16 interposed between the glass disc 11 and the rear side of the dial 14 tensionally retains the dial and blind in their rotatable adjusted positions as determined by varying installations as hereinafter described.

A hollow metallic curved diaphragm member 17 within the cylinder 6, sealed at its upper end and communicating with the threaded nipple 18 at its lower end, is of a conventional type of vacuum or pressure gauge, and is flexed by the suction or pressure withdrawal of the liquid within the supply tank in vacuum or gravity feed installations respectively.

A link 19 is pivotally connected to the upper end of the diaphragm member and to the yoke 20 which is fixed to the stem 21 passing through the disc 8 to whose outer end is secured a pointer 22. Flexing of the diaphragm member 17 by pressure or suction caused by withdrawal of the liquid from the supply tank thus causes the pointer to revolve.

Figure 1:
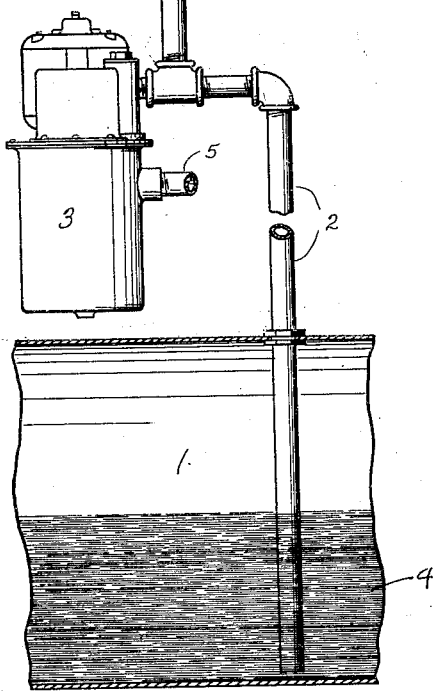
Figure 1 is a front elevational view, partly broken away, of a vacuum feed oil-burner installation employing the novel gauge for determining the amount of oil within the supply tank.
Figure 3:
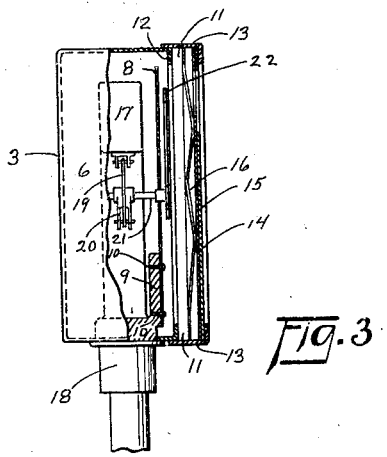
Figure 3 is a side elevational view of the gauge per se partly broken away to show the interior operating parts.
Figure 5:
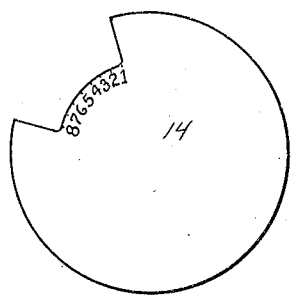
Figure 5 is a front elevational view of the blind which is rotatably adjustable for blanking predetermined lift indicia on the dial.
Figure 4:
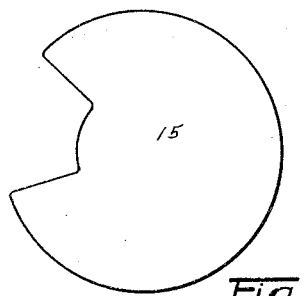
Figure 4 is a front elevational view of the dial which is adjustably adaptable for use in installations having varying lifts.

In actual initial installations, the supply tank is filled and the pump is started which causes the pointer to revolve to a given position from the "dead" position shown in Figure 1 to the exemplified position shown in Figures 1 and 2. Assuming the tank has a four foot diameter, the dial 14 is manually rotated so that the pointer is over the numeral 4 thereon and the blind is then manually rotated so that the numerals 5 to 8 inclusive are blanked out since they are of no use in the installation here exemplified. As the liquid within the supply tank is withdrawn, the pointer is caused to be moved toward the right. Thus, for example, if the tank has a 400 gallon capacity, the pointer at Figure 1 would indicate that the liquid within the tank is three-fourths depleted or contains 100 gallons of fuel.

It will thus be seen that the gauge herein shown and described is particularly adaptable for use in connection with oil-burner installations of both the vacuum and gravity feed type and that it is readily adjustable to installations of varying lifts.

While but one specific embodiment of this invention has been herein shown and described, it will be understood that numerous details of the construction shown may be altered or omitted without departing from the spirit of this invention as defined by the following claims.

I claim:

1. In a gauge for determining the quantity of liquid within a supply tank having a nipple adapted to be inserted in the feed line from the supply tank, an adjustably rotatable dial bearing lift indicia, and a pointer operable by the liquid withdrawal from the supply tank for indicating the quantity of liquid therein.

2. In a gauge for determining the quantity of liquid within a supply tank having a nipple adapted to be inserted in the feed line from the supply tank, an adjustably rotatable dial bearing lift indicia, a pointer operable by the liquid withdrawal from the supply tank for indicating the quantity of liquid therein, and an adjustably rotatable blind for blanking predetermined lift indicia.

3. In a gauge for determining the quantity of liquid within a supply tank having a nipple adapted to be inserted in the feed line from the supply tank, an adjustably rotatable dial bearing lift indicia, a pointer operable by the liquid withdrawal from the supply tank for indicating the quantity of liquid therein, and an adjustably rotatable blind mounted over said dial and having a segmental portion cut therefrom for disclosing predetermined lift indicia.

In testimony whereof I have hereunto set my hand at Grand Rapids, Michigan, this 15th day of May, 1931.

CLAUDE R. RICH.